No. 656,542. Patented Aug. 21, 1900.
J. L. HAM.
TIRE TIGHTENER.
(Application filed Mar. 3, 1900.)
(No Model.)
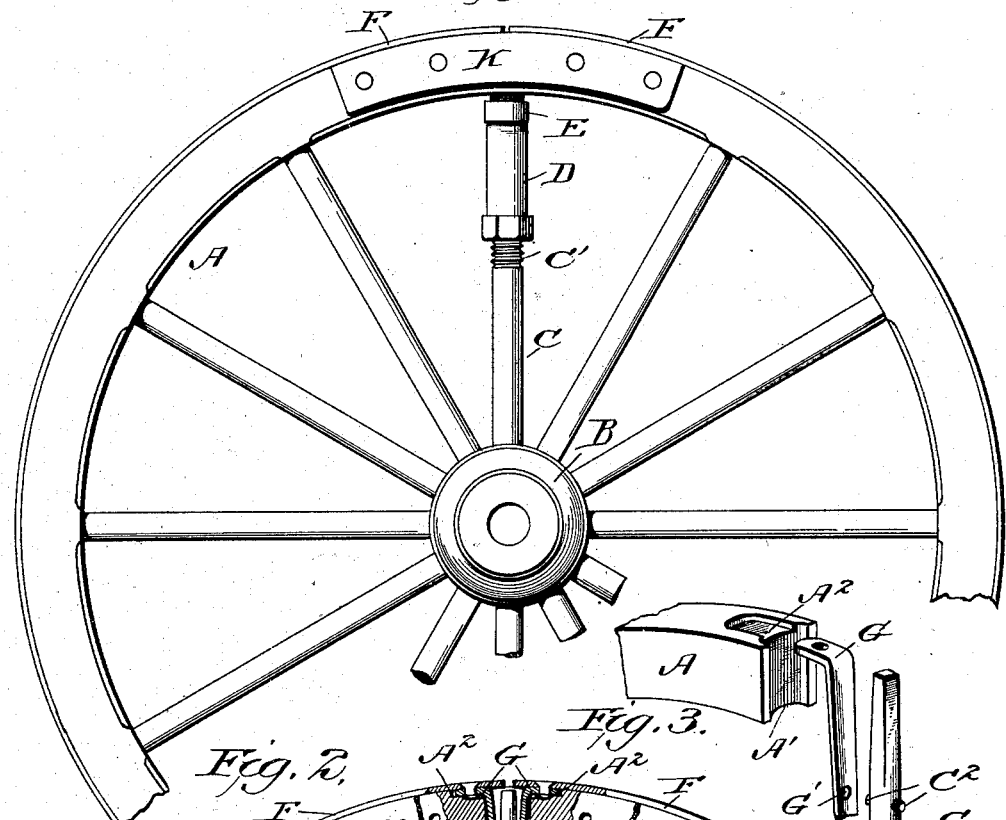
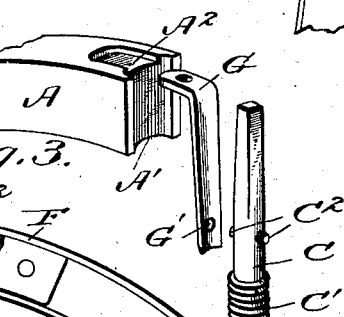
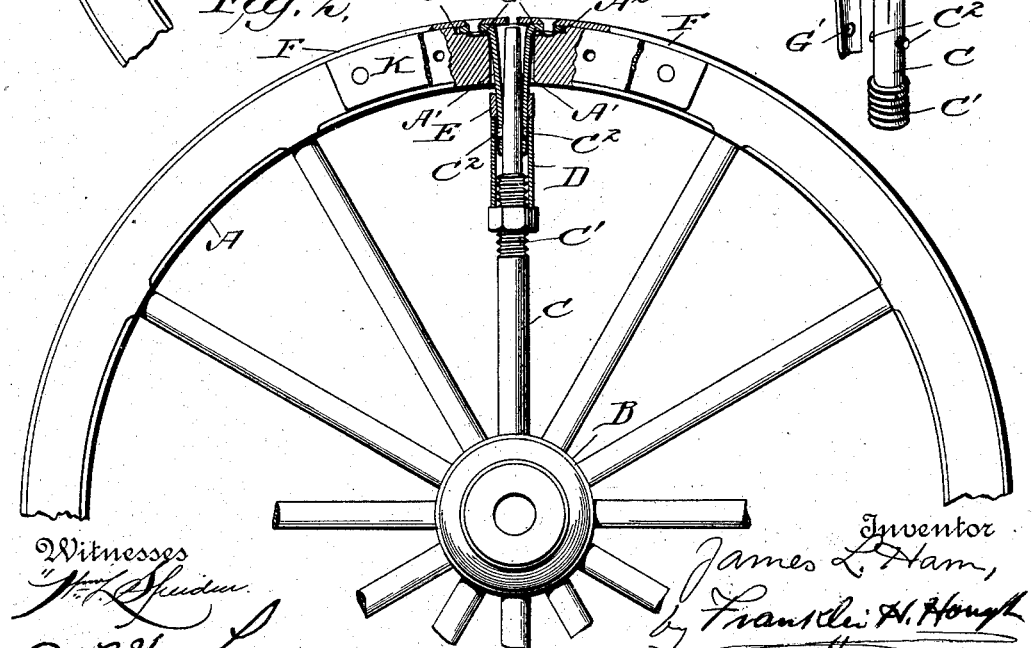
Witnesses
Inventor
James L. Ham,
by Franklin H. Hough
Attorney
THE NORRIS PETERS CO., PHOTO-LITHO., WASHINGTON, D. C.

UNITED STATES PATENT OFFICE.

JAMES LETCHER HAM, OF HUDDLESTON, VIRGINIA.

TIRE-TIGHTENER.

SPECIFICATION forming part of Letters Patent No. 656,542, dated August 21, 1900.

Application filed March 3, 1900. Serial No. 7,225. (No model.)

*To all whom it may concern:*

Be it known that I, JAMES LETCHER HAM, a citizen of the United States, residing at Huddleston, in the county of Alleghany and State of Virginia, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tire-tighteners, and especially to a means of tightening and loosening the tire by means of a thimble which is mounted on one of the spokes and, by means of a tightening-nut, is forced down over the angle-irons, which are fastened to the ends of the tires, said angle-irons being convexed on their outer faces and concaved on their inner faces and clamped by said thimble on opposite sides of the threaded shaft of the spoke, whereby as said thimble and washer, also passed about the angle-irons, are forced toward the tire or from same the tire will be respectively tightened and loosened.

To these ends, and to such others as the invention may pertain, the same consists, further, in the novel construction, combination, and adaptation of parts, as will be hereinafter more fully described and then specifically defined in the appended claims.

My invention is clearly illustrated in the accompanying drawings, which, with the letters of reference marked thereon, form a part of this application, and in which drawings similar letters of reference indicate like parts throughout the several views, in which—

Figure 1 is a side elevation of a wheel having my improved attachment secured thereto. Fig. 2 is a vertical sectional view through the wheel longitudinally of the tire. Fig. 3 is a view of detail.

Reference now being had to the details of the drawings by letter, A designates the felly of the wheel, having a space between the ends of said felly, said ends being concaved, as at $A'$, and recessed on top, as at $A^2$.

In the hub B are secured the usual spokes, also a metallic spoke C, and the latter is externally threaded, as at $C'$, and its outer end is slightly contracted and extends through the space between the ends of the felly. Mounted on said threaded portion of the metallic spoke is a thimble D and also a washer E.

Secured to the ends of the tire F are the angle-irons G, which may be fastened to the tires in such a manner as to allow of their being easily removed, said irons being concaved on their inner faces and convexed on their outer faces, as shown. The lower ends of said irons are apertured, as at $G'$, and are engaged in said apertures by the lugs $C'$ on opposite sides of the metallic spoke C. The convexed outer surfaces of said angle-irons are designed to rest against the concaved ends of the felly, and the outer bent ends rest in the recesses $A^2$, before described. After the ends of the tire have been fastened together or tightened the side plates K K are secured in place over the outer faces of the felly. In tightening the tire the two angle-irons secured to the two ends of the tire are hooked over the lugs on the spoke C, and the thimble and washer are forced over the outer faces of said angle-irons and toward the felly, and the two ends of the tires are drawn together. In loosening the tire the thimble and washer are forced in the opposite direction and the parts readily detached.

Having thus described my invention, what I claim to be new, and desire to secure by Letters Patent, is—

1. A device for tightening tires, comprising in combination with the tire, the angle-irons secured to the ends thereof, the felly, the hub and metallic spoke secured thereto, the thimble and washer mounted on said spoke, and adapted to embrace said angle-irons, and a tightening-nut working on the threaded portion of the spoke, as set forth.

2. A device for tightening tires, comprising in combination with the tire, the angle-irons secured to the ends thereof, the hub and metallic threaded spoke, the ends of said angle-irons apertured and designed to engage over lugs on said spoke, and the thimble and washer, and the tightening-nut, as set forth.

3. In combination with the tire having concavo-convex angle-irons secured thereto, the felly having concaved ends and recessed as described, the metallic spoke, the thimble, washer and threaded nut, said angle-irons designed to embrace the tapered or contracted portion of the spoke as the thimble and washer are forced toward the felly, as set forth.

In testimony whereof I affix my signature in presence of two witnesses.

JAMES LETCHER HAM.

Witnesses:
WM. E. ALLEN,
W. H. MCCONIHAY.